US012651354B2

(12) United States Patent
Excoffier et al.

(10) Patent No.: US 12,651,354 B2
(45) Date of Patent: Jun. 9, 2026

(54) METHOD FOR DETECTING THE MOTION OF AT LEAST ONE OBJECT, AND CORRESPONDING ELECTRONIC DEVICE, SYSTEM, COMPUTER PROGRAM PRODUCT AND MEDIUM

(71) Applicant: ORANGE, Issy-les-Moulineaux (FR)

(72) Inventors: David Excoffier, Chatillon Cedex (FR); Franck Roudet, Chatillon Cedex (FR); Olivier Hotel, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 488 days.

(21) Appl. No.: 18/068,792

(22) Filed: Dec. 20, 2022

(65) Prior Publication Data
US 2023/0410327 A1 Dec. 21, 2023

(30) Foreign Application Priority Data
Dec. 21, 2021 (FR) ...................................... 2114083

(51) Int. Cl.
*G06T 7/246* (2017.01)

(52) U.S. Cl.
CPC .... *G06T 7/248* (2017.01); *G06T 2207/10016* (2013.01); *G06T 2207/20072* (2013.01)

(58) Field of Classification Search
None
See application file for complete search history.

(56) References Cited

U.S. PATENT DOCUMENTS

| | | | | |
|---|---|---|---|---|
| 5,086,480 | A * | 2/1992 | Sexton | H04N 19/503 |
| | | | | 382/253 |
| 11,295,180 | B1 * | 4/2022 | Tolstov | G06V 20/70 |
| 2005/0104964 | A1 | 5/2005 | Bovyrin et al. | |
| 2006/0227862 | A1 | 10/2006 | Campbell et al. | |
| 2006/0245618 | A1 * | 11/2006 | Boregowda | G06T 7/215 |
| | | | | 382/107 |
| 2007/0183662 | A1 | 8/2007 | Wang et al. | |
| 2008/0166045 | A1 * | 7/2008 | Xu | G06T 7/277 |
| | | | | 382/170 |
| 2010/0165207 | A1 * | 7/2010 | Deng | H04N 5/144 |
| | | | | 348/620 |

(Continued)

FOREIGN PATENT DOCUMENTS

| | | | | | |
|---|---|---|---|---|---|
| CN | 111885281 | B | * | 12/2023 | H04N 23/81 |
| WO | WO-2006078996 | A2 | * | 7/2006 | A63F 13/00 |
| WO | 2021208275 | A1 | | 10/2021 | |

OTHER PUBLICATIONS

English translation and French Search Report and Written Opinion dated Aug. 7, 2022, for corresponding French Application No. 2114083, filed Dec. 21, 2021.

*Primary Examiner* — Randolph I Chu
(74) *Attorney, Agent, or Firm* — David D. Brush; Westman, Champlin & Koehler, P.A.

(57) ABSTRACT
A method implemented in an electronic device. The method includes: obtaining two temporally spaced apart images capturing the same scene of a video stream; obtaining a motion map representing differences between the components of the images in at least one video channel; and obtaining at least one geometric shape encompassing a set of moving portions of the motion map. Also provided are the corresponding electronic device, the computer program product and the medium.

20 Claims, 11 Drawing Sheets

(56) References Cited

U.S. PATENT DOCUMENTS

| | | | |
|---|---|---|---|
| 2010/0259676 A1* | 10/2010 | Swan | H04N 21/4884 |
| | | | 348/468 |
| 2015/0172705 A1* | 6/2015 | Lee | H04N 19/132 |
| | | | 375/240.16 |
| 2015/0279051 A1 | 10/2015 | Kovesi et al. | |
| 2017/0355336 A1* | 12/2017 | Freienstein | B60R 21/0132 |
| 2020/0134837 A1* | 4/2020 | Varadarajan | G06V 10/771 |
| 2021/0122364 A1* | 4/2021 | Lee | G06F 18/2413 |
| 2021/0272394 A1* | 9/2021 | Cella | G06Q 30/0207 |

* cited by examiner

METHOD FOR DETECTING THE MOTION OF AT LEAST ONE OBJECT, AND CORRESPONDING ELECTRONIC DEVICE, SYSTEM, COMPUTER PROGRAM PRODUCT AND MEDIUM

1. TECHNICAL FIELD

The present application relates to the field of detecting objects, such as moving objects. It can involve, according to the embodiments of the solution described in the present application, various objects, which may or may not be connected, such as vehicles, people, animals, robots, and/or machines, for example.

The present application particularly relates to a method for detecting the motion of at least one object, as well as to a corresponding electronic device, system, computer program product and storage medium.

2. PRIOR ART

The past several decades have witnessed a boom in automation in industry, transport and agriculture and, more recently, the development of connected environments in the private or public sphere (smart home, smart office, smart city). These automations and connected environments often involve objects, which may or may not be connected, and often require automatic detection of these objects (or would benefit from such detection).

Some existing solutions are based on information fed back by the objects themselves. However, these solutions are only applicable to connected objects and generally require the use of telecommunication resources and/or specific protocols in order to receive this information. Moreover, they are often dependent on external constraints, such as the willingness of the owners of the objects to activate this feedback of information, the load level of the objects, the network transmission quality, etc.

Other existing solutions can be applied more easily to non-connected objects. For example, in the field of transport, various techniques exist for counting vehicles. For example, some road traffic analysis techniques record the passage of vehicles using inductive loops placed under the roadway. A major disadvantage of such technologies is the cost of the fixed structures that these loops require. Thus, if not provided at the time of the construction of the roadway, installing inductive loops requires heavy construction work in order to integrate the inductive loops into the roadway and the necessary equipment on the roadside.

A requirement therefore exists for a solution for detecting objects that does not have all the aforementioned disadvantages, and in particular a solution that is simple to implement, does not require the installation of heavy physical infrastructures (mechanical or telecommunications) and is more economical in terms of digital resource consumption.

The aim of the present application is to propose improvements to at least some of the disadvantages of the prior art.

3. DISCLOSURE OF THE INVENTION

The present application aims to improve the situation by means of a method at least partially implemented in an electronic device.

In some embodiments, the method comprises:
obtaining at least two temporally spaced apart images capturing the same scene of a video stream;

obtaining at least one motion map representing differences between the components of said images, in at least one video channel;
obtaining at least one geometric shape encompassing a set of moving portions of said motion map.

In some embodiments, the value of a portion of the motion map that is obtained takes into account a variation of at least one R, G, B component between at least two of said obtained images, for a zone of said obtained images corresponding to said portion of the motion map.

In some embodiments, the value of a portion of the motion map that is obtained takes into account a variation of each R, G, B component between at least two of said obtained images, for a zone of said obtained images corresponding to said portion of the motion map.

In some embodiments, the method comprises:
obtaining at least two temporally spaced apart images capturing the same scene of a video stream;
obtaining at least a first motion map divided into portions representing differences between the values of at least two video channels, for a zone of at least two of said images,
obtaining at least one geometric shape encompassing a set of moving portions of said first motion map.

In some embodiments, the value of a portion of said first motion map is a binary value taking into account differences between the values of each video channel for said zone of said images.

In some embodiments, said value of a portion of said first motion map takes into account the most differences of each video channel for said zone of said images.

In some embodiments, the method comprises obtaining a motion map for each video channel of said images, with the motion map of a video channel of said images being divided into portions representing differences for a zone of at least two of said images, for the video channel associated with said motion map, and said first motion map is the motion map, from among the motion maps associated with each of the video channels of said images, that comprises the most portions for which the binary value represents a difference for a zone of said images, for the associated video channel.

In some embodiments, said geometric shape is a rectangular shape.

In some embodiments, the method comprises rotating said first motion map prior to dividing said first motion map.

In some embodiments, une motion map is a binary map with dimensions corresponding to those of the images of the video stream.

In some embodiments, said method is iteratively implemented on successive images of the video stream and comprises:
obtaining a first motion map and a second motion map temporally preceding said first motion map,
conditionally associating a first encompassing geometric shape obtained for the first motion map with at least one second encompassing geometric shape obtained for said second motion map, said associating taking into account the relative positions of said first and second encompassing shapes on said first and second motion maps.

In some embodiments, said association takes into account a distance between the centroids of the first and second encompassing geometric shapes that are obtained.

In some embodiments, the second geometric shape is the encompassing geometric shape of said second motion map that is spatially closest to said first encompassing geometric shape.

In some embodiments, said association is implemented when said distance between the centroids of the first and second encompassing geometric shapes that are obtained is less than a first distance.

In some embodiments, the method comprises assigning the same object identifier to said first and second associated geometric shapes.

In some embodiments, the method comprises assigning a type of object to at least one encompassing geometric shape, with said assigning taking into account a size, a width and/or a length of said encompassing geometric shape (for example, a ratio between the width and/or the length of the encompassing geometric shape).

In at least one embodiment, the method comprises counting the encompassing geometric shapes of at least one motion map, with said counting taking into account a proximity with at least one portion, called portion of interest, of said motion map.

In some embodiments, said counting of encompassing geometric shapes takes into account a direction of movement of an object corresponding to several mutually associated encompassing geometric shapes, of several motion maps, between said motion maps.

In some embodiments, obtaining at least one encompassing geometric shape of a motion map comprises:

obtaining a first histogram relating to portions resulting from the division of said motion map into rows and columns along two different division axes, with the first histogram counting the number of moving portions per column in said motion map;

obtaining a second histogram relating to said portions, with said second histogram counting the number of moving portions per row in said motion map;

obtaining at least one encompassing geometric shape corresponding to the intersection in the motion map of the columns comprising at least one non-zero element of the first histogram and of the rows comprising at least one non-zero element of the second histogram.

In at least one embodiment, the method comprises:

obtaining a third histogram counting the number of moving portions per column in at least one third shape of said obtained encompassing shapes;

obtaining a fourth histogram counting the number of moving portions per row in said third obtained encompassing shape;

obtaining at least a fourth encompassing geometric shape corresponding to the intersection in the motion map of the columns comprising at least one non-zero element of the third histogram and of the rows comprising at least one non-zero element of the fourth histogram.

In some embodiments, said steps of obtaining said third and fourth histograms are implemented successively on at least one previously obtained encompassing geometric shape of the motion map.

The features, which are presented in isolation in the present application in relation to some embodiments of the method of the present application can be combined together according to other embodiments of the present method.

According to another aspect, the present application also relates to an electronic device adapted to implement the method of the present application in any of its embodiments.

For example, the present application thus relates to an electronic device comprising at least one processor configured for:

obtaining at least two temporally spaced apart images capturing the same scene of a video stream;

obtaining at least one motion map representing differences between the components of said images, in at least one video channel;

obtaining at least one geometric shape encompassing a set of moving portions of said motion map.

For example, the present application thus relates to an electronic device comprising at least one processor, with said at least one processor being configured for:

obtaining at least two temporally spaced apart images capturing the same scene of a video stream;

obtaining at least one first motion map divided into portions representing differences between the values of at least two video channels for a zone of at least two of said images;

obtaining at least one geometric shape encompassing a set of moving portions of said first motion map.

According to another aspect, the present application also relates to a system comprising at least one electronic device adapted to implement the method of the present application in any one of its embodiments.

For example, the present application thus relates to a system comprising at least one electronic device comprising at least one processor configured for:

obtaining at least two temporally spaced apart images capturing the same scene of a video stream;

obtaining at least one motion map representing differences between the components of said images, in at least one video channel;

obtaining at least one geometric shape encompassing a set of moving portions of said motion map.

For example, the present application thus relates to a system comprising at least one electronic device comprising at least one processor, with said at least one processor being configured for:

obtaining at least two temporally spaced apart images capturing the same scene of a video stream;

obtaining at least one first motion map divided into portions representing differences between the values of at least two video channels for a zone of at least two of said images;

obtaining at least one geometric shape encompassing a set of moving portions of said first motion map.

The present application also relates to a computer program comprising instructions for implementing the various embodiments of the above method, when the program is executed by a processor, and to a processor-readable storage medium of an electronic device and on which the computer program is stored.

For example, the present application thus relates to a computer program comprising instructions for implementing, when the program is executed by a processor of an electronic device, a method comprising:

obtaining at least two temporally spaced apart images capturing the same scene of a video stream;

obtaining at least one motion map representing differences between the components of said images in at least one video channel;

obtaining at least one geometric shape encompassing a set of moving portions of said motion map.

For example, the present application also relates to a computer program comprising instructions for implementing, when the program is executed by a processor of an electronic device, a method comprising:

obtaining at least two temporally spaced apart images capturing the same scene of a video stream;

obtaining at least one first motion map divided into portions representing differences between the values of at least two video channels for a zone of at least two of said images, obtaining at least one geometric shape encompassing a set of moving portions of said first motion map.

For example, the present application also relates to a processor-readable storage medium of an electronic device and on which a computer program is stored comprising instructions for implementing, when the program is executed by the processor, a method comprising:

obtaining at least two temporally spaced apart images capturing the same scene of a video stream;

obtaining at least one motion map representing differences between the components of said images in at least one video channel;

obtaining at least one geometric shape encompassing a set of moving portions of said motion map.

For example, the present application also relates to a processor-readable storage medium of an electronic device and on which a computer program is stored comprising instructions for implementing, when the program is executed by the processor, a method comprising:

obtaining at least two temporally spaced apart images capturing the same scene of a video stream;

obtaining at least one first motion map divided into portions representing differences between the values of at least two video channels for a zone of at least two of said images, obtaining at least one geometric shape encompassing a set of moving portions of said first motion map.

The aforementioned programs can use any programming language, and can be in the form of source code, object code, or of intermediate code between source code and object code, such as in a partially compiled form, or in any other desirable form.

The aforementioned information media can be any entity or device capable of storing the program. For example, a medium can comprise a storage means, such as a ROM, for example, a CD-ROM or a microelectronic circuit ROM, or even a magnetic recording medium.

Such a storage means can be, for example, a hard disk, a flash memory, etc.

Moreover, an information medium can be a transmissible medium such as an electrical or optical signal, which can be routed via an electrical or optical cable, by radio or by other means.

In particular, a program according to the invention can be downloaded over an Internet-type network.

Alternatively, an information medium can be an integrated circuit in which a program is incorporated, with the circuit being adapted to execute, or to be used in the execution of, any one of the embodiments of the method that is the subject matter of this patent application.

4. BRIEF DESCRIPTION OF THE DRAWINGS

Further features and advantages of the invention will become more clearly apparent from reading the following description of particular embodiments, which are provided by way of simple illustrative and non-limiting examples, and from the appended drawings, in which:

FIG. 1 shows a simplified view of a system, cited as an example, in which at least some embodiments of the method of the present application can be implemented, FIG. 2 shows a simplified view of a device adapted to implement at least some embodiments of the method of the present application, FIG. 3 shows an overview of the method of the present application, in some of its embodiments, FIG. 4 shows an example of obtaining a motion map, in some embodiments of the method of the present application.

5. DESCRIPTION OF THE EMBODIMENTS

The present application proposes a solution based on an analysis of a video stream representing a scene (or zone) to be monitored, for detecting objects moving in this scene. A movement within the monitored scene will be reflected in differences between successive images of the video stream.

According to some embodiments of the method of the present application, the differences between several successive images of the stream can allow a map to be obtained that represents the movements that have occurred in the monitored scene between these images.

This map is also called "motion map" throughout the present application.

The motion map is divided into portions indicating the presence or absence of motion, between these images, in zones of the scene. In some embodiments, the method of the present application can consolidate portions associated with moving zones (also called motion portions for the sake of simplification) and their association with objects, and, optionally, implement tracking of these objects over the motion maps. It may be possible, for example, to count these objects, to identify them, or to generate statistics relating to these objects.

In the examples described hereafter, the scene to be monitored is a highway scene, on which moving vehicles (cars, trucks, motorbikes, etc.) are travelling. However, it is clear that some embodiments of the method that is the subject matter of this application can be implemented in other environments (in particular for other types of scenes to be monitored (for example, a factory workshop, a shopping center, a residential room, a shopping street, an animal point of passage, etc.) for detecting various objects (robots, vehicles, pedestrians, animals, etc.).

The present application will now be described in more detail with reference to FIG. 1.

Figure 1:
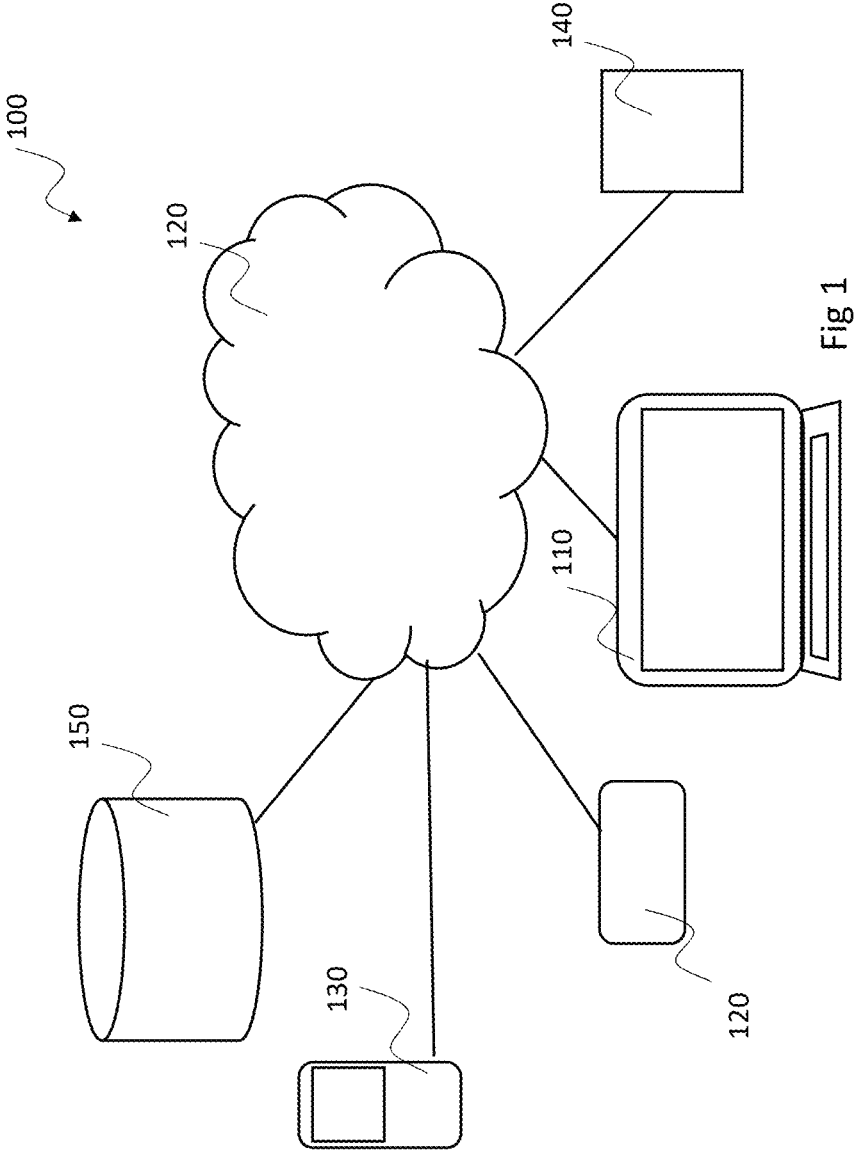

FIG. 1 shows a telecommunication system 100, in which the method of the present application can be implemented, in at least some of its embodiments. The system 100 comprises one or more electronic device(s), at least some of which can communicate with each other via one or more, optionally interconnected, communication networks 120, such as a local network or LAN (Local Area Network) and/or a wide network or WAN (Wide Area Network). For example, the network can comprise a company or home LAN and/or a WAN of the Internet type, or a cellular network (GSM—Global System for Mobile Communications, UMTS—Universal Mobile Telecommunications System, Wi-Fi—Wireless, etc.).

As illustrated in FIG. 1, the system 100 can also comprise a plurality of electronic devices, such as a communication terminal (such as a computer 110, for example, a laptop, a smartphone 120, a tablet 130), and/or a server 140, for example, a server adapted to process (for example, analyze) data obtained via at least one of the electronic devices of the system 1, a storage device 150, for example, a storage device adapted to process (for example, analyze) data obtained via at least one of the electronic devices of the system 1. The system can also comprise network management and/or inter-connection elements (not shown).

Figure 2:
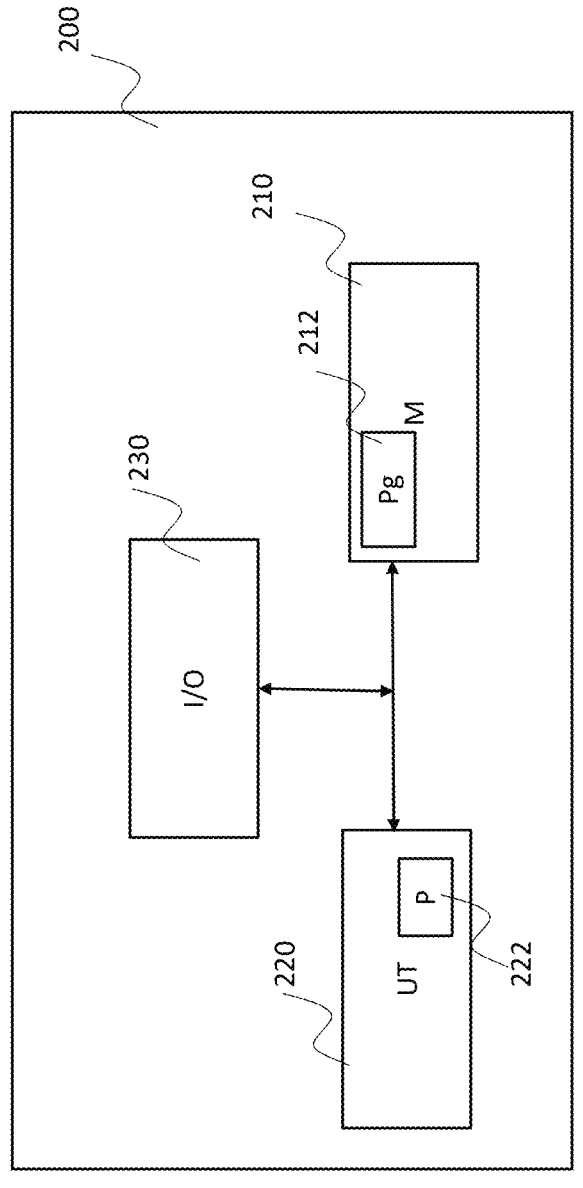

FIG. 2 illustrates a simplified structure of an electronic device 200 of the system 100, for example, the device 110, 130 or 140 of FIG. 1, adapted to implement the principles of the present application. According to the embodiments, it can be a server, and/or a terminal.

In particular, the device 200 comprises at least one memory M 210. The device 200 can particularly comprise a buffer memory, a volatile memory, for example, of the RAM type (Random Access Memory), and/or a non-volatile memory (for example, of the ROM type (Read Only Memory)). The device 200 can also comprise a processing unit UT 220, equipped, for example, with at least one processor P 222, and driven by a computer program PG 212 stored in a memory M 210. On initialization, the code instructions of the computer program PG are loaded, for example, into a RAM memory before being executed by the processor P. Said at least one processor P 222 of the processing unit UT 220 can particularly implement, individually or collectively, any one of the embodiments of the method of the present application (particularly described in relation to FIG. 3), according to the instructions of the computer program PG.

The device can also comprise, or be coupled to, at least one input/output I/O module 230, such as a communication module, allowing, for example, the device 200 to communicate with other devices of the system 100, via wired or wireless communication interfaces, and/or such as an acquisition module allowing the device to obtain (for example, acquire) data representing an environment to be monitored, and/or such as a module for interfacing with a user of the device (also more simply called "user interface" in this application).

The term "user interface" of the device is understood to mean, for example, an interface integrated into the device 200, or part of a third party device coupled to this device by wired or wireless communication means. For example, it can be a secondary screen of the device or a set of speakers connected to the device by wireless technology.

In particular, a user interface can be a user interface, called "output" user interface, adapted to render (or to control rendering of) an output element of a computer application used by the device 200, for example, an application at least partially running on the device 200 or an "online" application at least partially running remotely, for example, on the server 140 of the system 100. Examples of an output user interface of the device include one or more screen(s), in particular at least one graphic screen (for example, a touch screen), one or more speaker(s), and a connected headset. The interface of the device 200 can be adapted, for example, to render the images illustrated in any of FIGS. 4, 9 to 11.

The term "rendering" is understood herein to mean a restitution (or "output") on at least one user interface, in any form, for example, comprising textual, audio and/or video components, or a combination of such components.

Furthermore, a user interface can be an "input" user interface, adapted to acquire a command from a user of the device 200. In particular, this can involve an action to be carried out in conjunction with a rendered item, and/or a command to be transmitted to a computer application used by the device 200, for example, an application at least partially running on the device 200 or an "online" application at least partially running remotely, for example on the server 140 of the system 100. Examples of an input user interface of the device 200 include a sensor or several sensors, an audio and/or video acquisition means (microphone, camera (webcam), for example), a keyboard, a mouse.

As indicated above, the device can comprise or be coupled to (via its communication means) at least one acquisition module, such as a sensor (hardware and/or software) coupled to said device, such as a video camera, allowing a video stream to be acquired that represents the scene to be monitored. According to the embodiments (and the applications) of the method of the present application, various video cameras can be used for capturing the scene: for example, it can be a video camera with a wide angle of view or with a more limited angle of view, a USB or IP camera (connected, for example, to the input/output I/O module 230 of the device 200).

The device can also comprise or be coupled to other types of sensors, capable, for example, of reporting on a physical environment to be monitored and/or the situation of a capturing module (for example, a position and/or an orientation of a camera monitoring the scene).

The information acquired via the acquisition and input/output modules can be transmitted, for example, to the processing module 210.

For example, said at least one processor of the device 200 particularly can be adapted for:

obtaining at least two temporally spaced apart images capturing the same scene of a video stream;

obtaining at least one motion map representing differences between the components of said images, in at least one video channel;

obtaining at least one geometric shape encompassing a set of moving portions of said motion map.

For example, said at least one processor of the device 200 particularly can be adapted for:

obtaining at least two temporally spaced apart images capturing the same scene of a video stream;

obtaining at least one first motion map divided into portions representing differences between the values of at least two video channels for a zone of at least two of said images;

obtaining at least one geometric shape encompassing a set of moving portions of said first motion map.

Some of the above input-output modules are optional and therefore can be absent from the device 200 in some embodiments. In particular, while the present application is sometimes described in conjunction with a device communicating with at least one second device of the system 100, the method also can be locally implemented by the device 200, without requiring exchanges with another device, in some embodiments. For example, in some embodiments, the device can use information acquired by a camera inside the device and operating continuously, and can render data resulting from processing this information in real time on a screen local to the device (for example, a traffic congestion warning at a point of passage, forming the scene to be monitored, of a highway where the device is installed).

Thus, at least some of the embodiments of the method of the present application propose a solution that can assist in locally analyzing a flow of vehicles, without requiring a video stream (capturing images of the flow of vehicles) to be sent to a remote or cloud-based server.

In some embodiments, by contrast, the method can be implemented in a distributed manner between at least two devices 110, 120, 130, and/or 150 of the system 100. For example, the device 200 can be installed in a centralized control station and can obtain, via a communication module of the device, information acquired by one or more camera(s) installed on points of passage to be monitored of a highway and belonging to the same local network as the device 200.

The term "module" or the term "component" or "element" of the device are understood herein to mean a hardware element, in particular wired, or a software element, or a combination of at least one hardware element and at least one software element. The method according to the invention therefore can be implemented in various ways, in particular in wired form and/or in software form.

Figure 3:
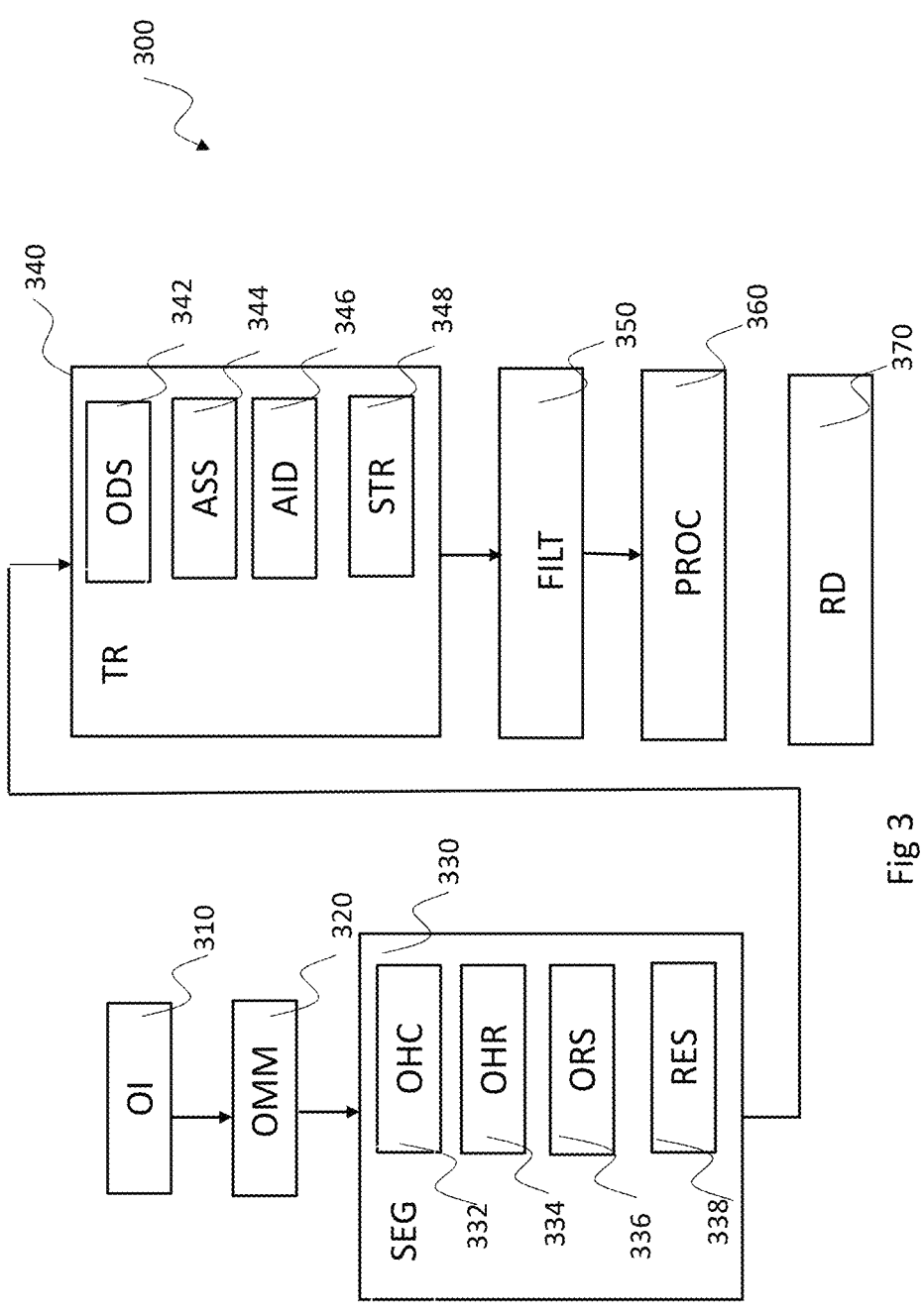

FIG. 3 illustrates some embodiments of the method 300 of the present application. The method 300 can be implemented, for example, by the electronic device 200 shown in FIG. 2.

As illustrated in FIG. 3, the method 300 can comprise obtaining 310 a plurality N of successive images of a video stream capturing a scene to be monitored (i.e., capturing images of the scene) (with N: being an integer greater than or equal to 2, for example, with a value of 2, 3 or 5).

For example, it can be the N most recent images of a video stream being acquired.

The term "obtaining an element" in the present application is understood to mean, for example, a reception of this element from a communication network, an acquisition of this element (via user interface elements or sensors, for example), a creation of this element by various processing means such as by copying, encoding, decoding, transformation, etc., and/or an access to this element from a local or remote storage medium accessible to the device implementing this obtaining step.

Obtaining 310 the images can include, for example, receiving at least one portion of the video stream on a communication interface of the device and/or read access to a local or remote storage zone of at least one portion of the video stream (for example, a database, as illustrated by element 150 of FIG. 1), or even read access to a buffer memory write-accessed by at least one camera monitoring the scene.

In some embodiments, the video stream can be acquired by a single camera, in an unchanged position, orientation and/or shooting angle throughout the acquisition.

Each of the N images can have several components, for example, three R, G, and B components, corresponding to the video channels (red, green, blue (RGB)).

Throughout the remainder of this document, $img_t$, $img_{t-1}$ and $img_{t-2}$ respectively designate the image at an instant t, for example the current instant of the video stream, and the two previous images.

In addition, the following designations are respectively used:

$img_t(R)$, $img_t(V)$ and $img_t(B)$ for the red, green and blue components of the image $img_t$;

$img_{t-1}(R)$, $img_{t-1}(V)$ and $img_{t-1}(B)$ for the red, green and blue components of the image $img_{t-1}$; and $img_{t-2}(R)$, $img_{t-2}(V)$ and $img_{t-2}(B)$ for the red, green and blue components of the image $img_{t-2}$.

Optionally, obtaining 310 an image can also include obtaining additional data (or metadata) associated with this image, such as a date and/or time of shooting, an identifier of the camera that acquired the image, an identifier of the image in the acquired video stream, information relating to the positioning and/or shooting of a camera that acquired at least a portion of the video stream, etc.

Figure 4:
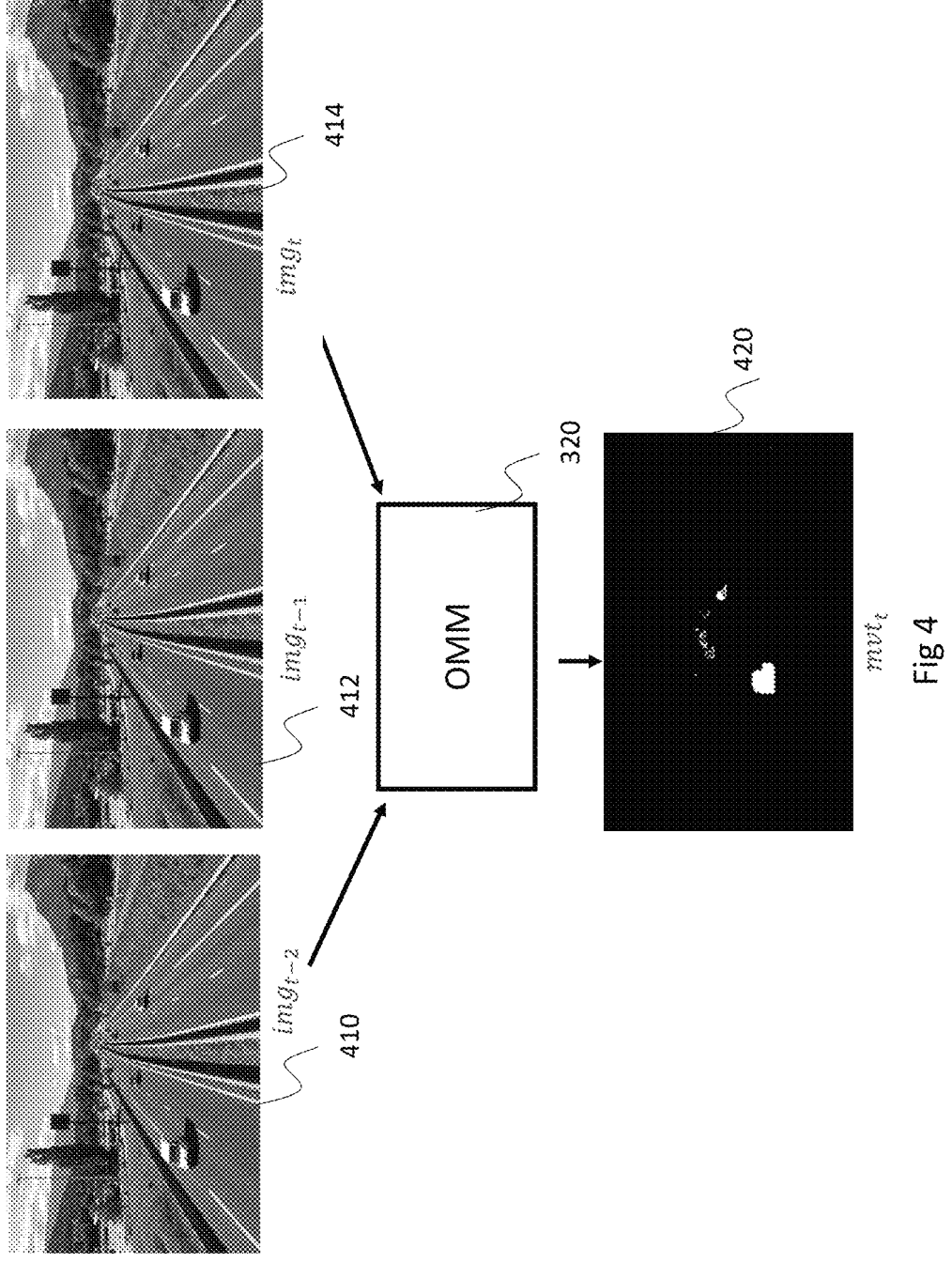

As illustrated in FIG. 3, as well as in FIG. 4, the method can also include obtaining (for example, generating) 320 a map (called a motion map) representing the movements that occurred in the monitored scene between the N obtained images. The motion map obtained from the image $img_t$ and the previous N−1 images is denoted $mvt_t$.

FIG. 4 illustrates an example of a motion map 420 obtained 320 from 3 successive obtained images $img_{t-2}$ 410, $img_{t-1}$ 412 and $img_t$ 414, (the three most recent images of the video stream, for example). In the illustrated example, a portion of the motion map 420 corresponds to a pixel of the obtained images.

In some embodiments, the motion map can be divided into separate portions (forming a partition of the map), with each portion being associated with a distinct zone of the images of the monitored scene, so as to generate a partition of the obtained images (and therefore a partition of the scene to be monitored). According to the embodiments, these portions can assume an identical size and/or shape for the entire map or, on the contrary, can assume a variable size and/or shape. For example, in some embodiments, each portion (for example, pixel) of the motion map can represent P pixels in the obtained images, with P being a constant natural integer (i.e., it can be a 1-P correspondence (P>=1).

In some embodiments, the portions of the motion map can correspond to different sized zones in the obtained images. In particular, in some embodiments, two identically sized portions of the same motion map can correspond to different sized image zones, with the size of the image zone assigned to a portion of the motion map depending, for example, on a probability of the presence of motion within the image zone. Thus, when the scene to be monitored includes a point of passage of a highway, the size of an image zone representing a portion of the highway (i.e., the roadway), where cars frequently travel, can be smaller than the size of a zone representing the outskirts of the highway, which generally remain unoccupied.

In some embodiments, the motion map can be a binary map, where all portions of the map corresponding to an image zone where motion has been detected are assigned a first and the same constant value (for example, 1), with all the portions of the motion map corresponding to an image zone where no motion has been detected being assigned a second and the same constant value (for example, 0).

In some embodiments, obtaining the binary map can take into account differences between the same components (for example, according to at least the same R, G, or B video channel) of at least some of the N obtained images. For example, in some embodiments, differences between the components of each R, G, and B video channel of at least some of the N obtained images, for example, all the N obtained images, can be taken into account. In other embodiments, differences between the components of a single R, G, or B video channel of all the N obtained images can be taken into account.

In some embodiments, the differences between each video component of the images can be evaluated for each portion, so as to take into account the existence of a significant difference in at least one of the video components for each portion. Such an embodiment can allow more visible differences to be detected on a first video component of the images for a first portion of the motion map and more visible differences to be detected on a second video component of the images for a second portion of the motion map (as a function of, for example, the colors of the moving objects in the obtained images). For example, in an embodiment where the 3 RGB video components of 3 successive images (N=3) are taken into account and where the motion map is a binary map where a pixel $mvt_t(i,j)$ of the motion map corresponds to a pixel on the abscissa i and on the ordinate j in a component of an obtained image ($img_t$(R, i, j) representing, for example, the value of the R component of the pixel with the coordinate (i, j) of $img_t$), the value of the pixel $mvt_t(i,j)$ of the motion map can be obtained by applying the following formula. In this formula, T is a natural, strictly positive integer that represents a variation amplitude (for example, a minimum variation).

$$mvt_t(i, j) = 1 \text{ if:}$$

$$\max \begin{pmatrix} img_t(R, i, j) - 2img_{t-1}(R, i, j) + img_{t-2}(R, i, j); \\ img_t(V, i, j) - 2img_{t-1}(Vi, j) + img_{t-2}(V, i, j); \\ img_t(B, i, j) - 2img_{t-1}(B, i, j) + img_{t-2}(B, i, j) \end{pmatrix} > T$$

$$mvt_t(i, j) = 0 \text{ otherwise}$$

In an alternative embodiment, the value of a portion of the motion map can be obtained by computing a difference between the R, G, or B values of each component for the pixels of the images matching the considered portion of the motion map. For example, in some embodiments where the 3 RGB video components of 3 successive images (N=3) are taken into account and where the motion map is a binary map, the value of a portion of a motion map can be obtained by computing a difference between average R, G, or B values of each component for the pixels of the images matching the considered portion.

In yet another alternative embodiment, the motion map can be selected from among the motion maps of the 3 video components as being the motion map (from among these 3 maps) with the most differences.

The value of T can differ according to the embodiments. For example, the value of T can be a function of a desired sensitivity (which can be defined via a user interface of the device and/or via read access to a configuration file) and/or of feature(s) of the capture of the scene. For example, it can be a function of an amount of light received by the camera capturing the scene.

In some embodiments, T can have a constant value (like of the order of a few dozen, for example 25). In the example shown in FIG. 3, the detection method further comprises segmentation 330 of the previously generated motion map $mvt_t$, taking into account at least one moving object in the map.

In particular, in some embodiments, the purpose of this segmentation is to locate geometric shapes (for example, the smallest possible ones) on the motion map encompassing at least one set of moving portions (i.e., a set of white pixels in the example of FIG. 4) and potentially associated with the same object.

In the illustrated embodiments where the motion map is divided along vertical and horizontal axes, forming rows and columns of portions (squares or rectangles), a set of portions associated with the same object is a set of squares or rectangles. The segmentation 330 is intended to generate 336 rectangular shapes each encompassing a set of portions. Of course, in other embodiments where the motion map is divided differently (for example, into arcs of a circle), the geometric shapes derived from the segmentation can be shapes other than rectangular shapes.

In the examples illustrated in FIGS. 5 to 8, which represent part of a motion map, rectangular encompassing geometric shapes 540, 550, 560, 570 corresponding to the intersections of columns and rows each comprising at least one moving portion can be obtained 336.

This obtaining step 336 can be based, for example, on histograms (as described in further detail hereafter).

Thus, in some embodiments, as illustrated in FIGS. 3 and 5 to 8, the segmentation 330 can comprise:

obtaining 332 a first histogram 510, along the vertical axis of the map $mvt_t$, counting the number of moving portions with which a motion is associated (for example, the white pixels in the example of FIG. 4) for each column of the motion map. This histogram 510 can assume the form, for example, in the illustrated example, of a first table (or list), the length of which (i.e., the number of elements) being identical to the number of columns of the motion map.

obtaining 334 a second histogram 520, along the horizontal axis of the map $mvt_t$, counting the number of moving portions with which a motion is associated (for example, the white pixels in the example of FIG. 4) for each row of the motion map. This histogram 520 can assume the form, for example, in the illustrated example, of a second table (or list), the length of which being identical to the number of rows of the motion map.

In some embodiments, the two histograms can be obtained together. For example, as illustrated in FIG. 5, the method can comprise setting the first 510 and second 520 tables to 0, then browsing the map $mvt_t$ 420, in order to increment, for each moving portion $p_i$ 530 of the map (i.e., each white pixel (with a value of 1, for example) according to the example of FIG. 4), the value of the boxes 512, 522 of the first and second table that respectively correspond to the column and row number of the portion $p_i$ 530 in the motion map.

obtaining 336 encompassing geometric shapes (rectangular in the illustrated example) 540, 570, 560, 570 on the motion map, taking into account the values of the histograms. For example, in some embodiments, encompassing geometric shapes can be obtained in the intersections of the columns and rows where the values of the histograms are non-zero.

Figure 5:
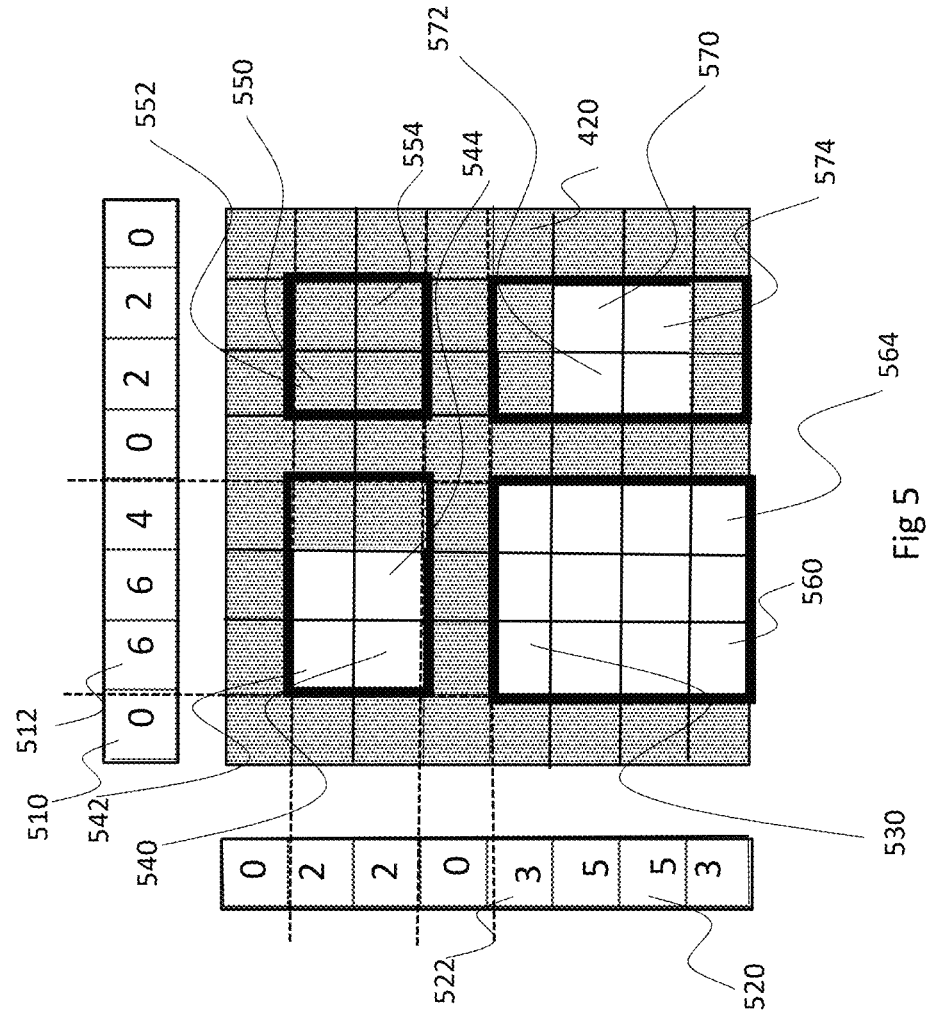
FIG. 5 shows an example of obtaining histograms from part of a motion map, in some embodiments of the method of the present application.

FIG. 5 illustrates the encompassing geometric shapes 540, 550, 560, 570 obtained by taking into account the first 510 and second 520 histograms. The periphery (boundary) of at least one encompassing geometric shape can be obtained by identifying the row and column numbers corresponding to the boxes of the histograms 510, 520 where a transition from a zero value to a non-zero value is observed, or vice versa.

For example, when browsing the first histogram from left-to-right and the second histogram from top-to-bottom, a transition from 0 to a value other than 0 in both histograms can correspond to the upper left-hand corner 542, 552, 562, 572 of an encompassing geometric shape 540, 550, 560, 570, and a transition of both histograms from a value other than 0 to a value equal to 0 can correspond to the lower right-hand corner 544, 564, 574 of an encompassing geometric shape 540, 550, 560, 570.

Figure 6:
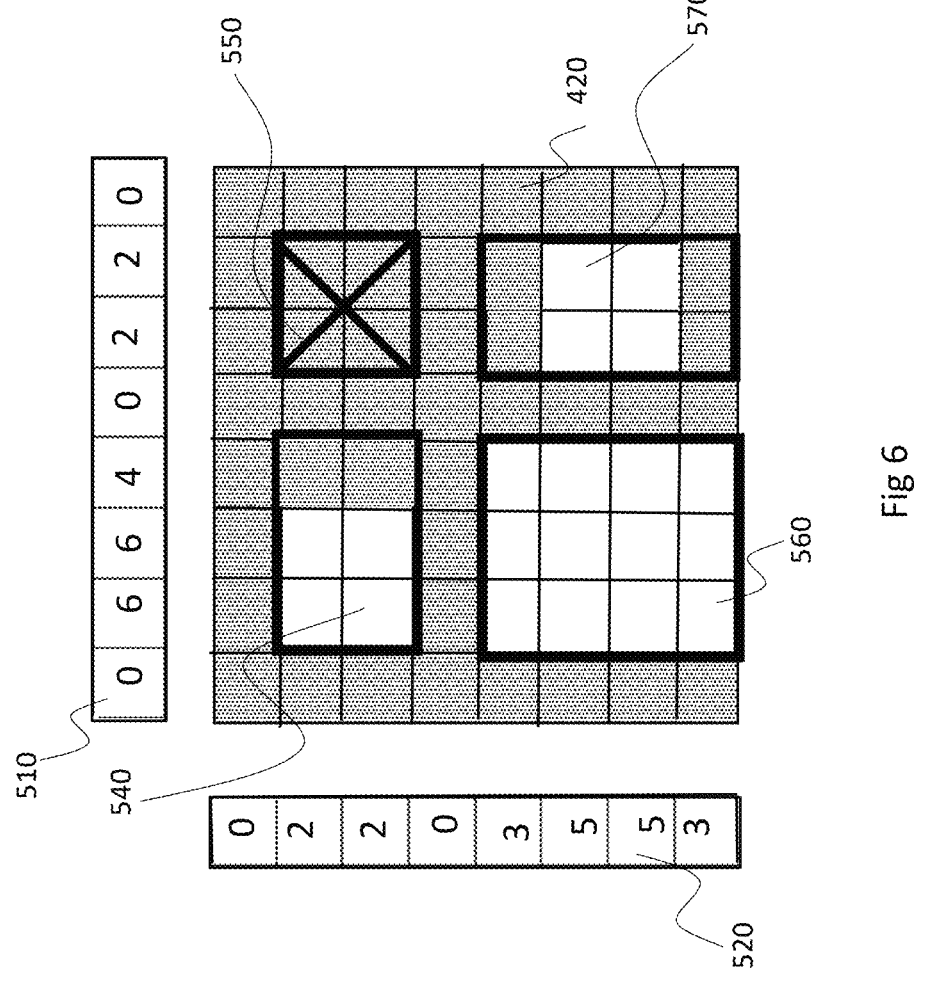
FIG. 6 shows an example of obtaining encompassing geometric shapes from the histograms of FIG. 5, in some embodiments of the method of the present application.

In some embodiments, as illustrated in FIG. 6, the method can also include deleting 338 the encompassing geometric shapes 550 (called "empty") that do not include any moving portion (i.e., only comprising black pixels in the example of FIG. 4), so as to delete the "phantom" encompassing geometric shapes that have arisen as a result of the "cumulative" histogram approach and to retain only those encompassing geometric shapes comprising at least one moving portion.

Figure 7:
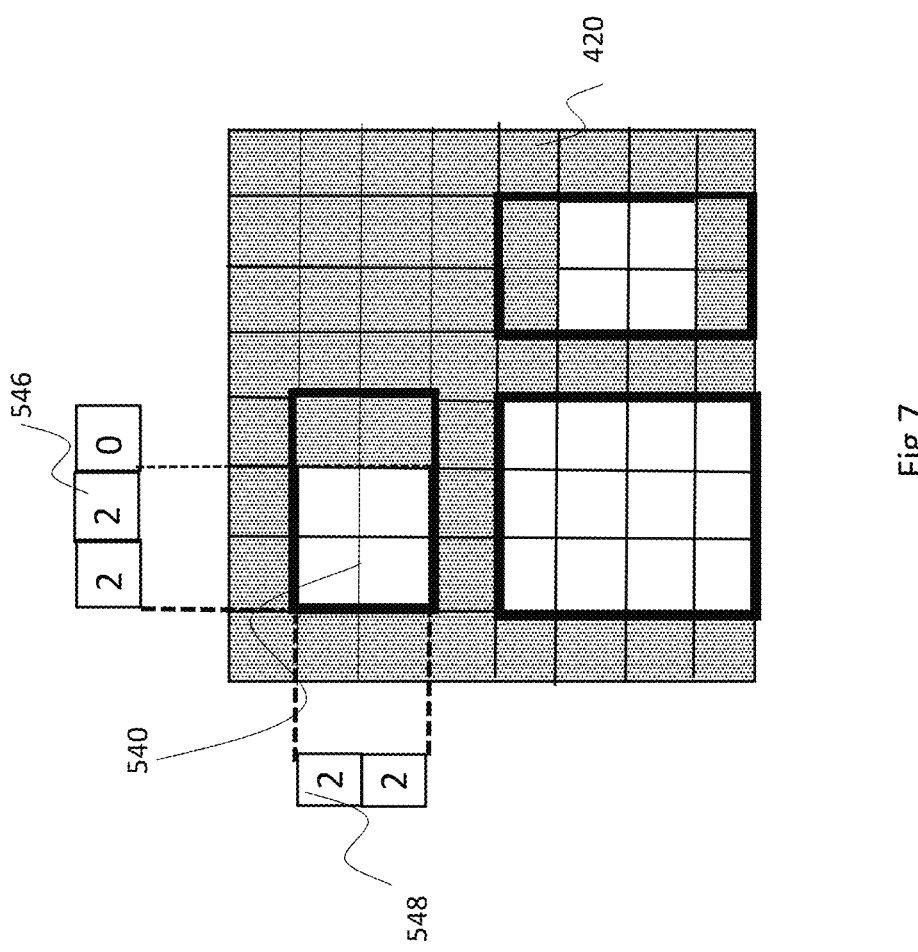
FIG. 7 shows an example of obtaining a new encompassing geometric shape from histograms relating to one of the encompassing geometric shapes of FIG. 5, in some embodiments of the method of the present application.
Figure 8:
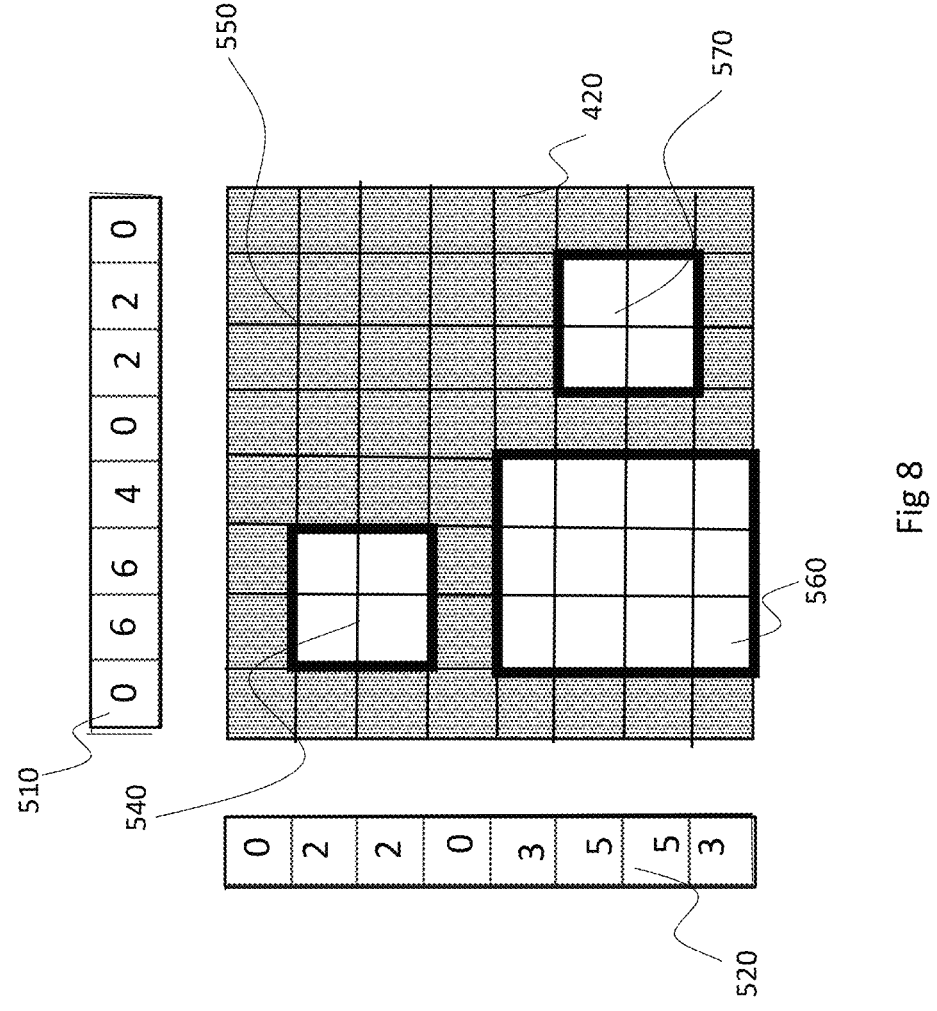
FIG. 8 shows an example of encompassing geometric shapes obtained from the part of the motion map of FIG. 5, at the end of segmentation, according to some embodiments of the method of the present application.
Figure 9:
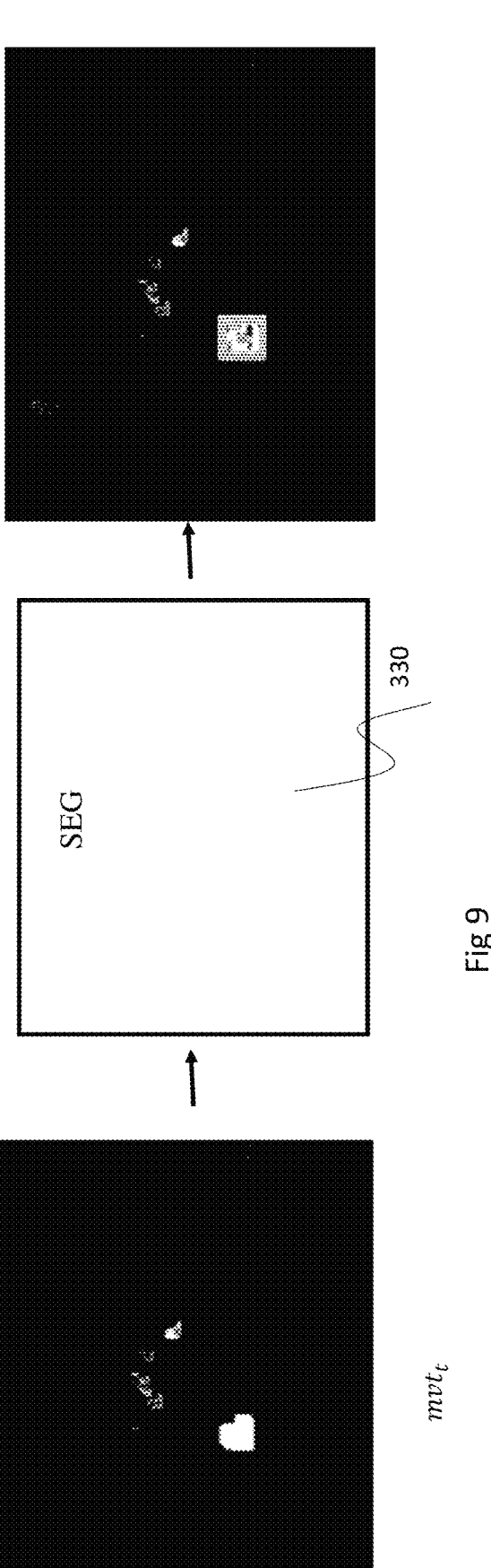
FIG. 9 shows an example of obtaining an encompassing geometric shape from the motion map of FIG. 4, in some embodiments of the method of the present application.
Figure 10:
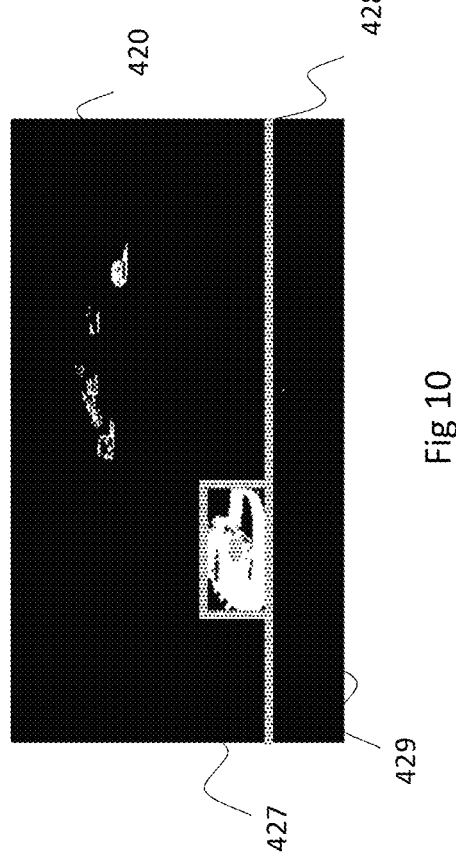
FIG. 10 shows an example of a line of interest of a motion map, according to some embodiments of the method of the present application.

As illustrated in FIG. 6, some of the encompassing geometric shapes 540, 560 retained after deleting the empty encompassing geometric shapes, therefore comprising at least one moving portion (and therefore corresponding to a "real" moving object in the captured scene) can still "carry over" from the real objects (i.e., contain portions not corresponding to a movement of the object). Also, in some embodiments, as illustrated in FIG. 7, the method can comprise at least one iteration of the steps of obtaining histograms and encompassing geometric shapes, not from the motion map as described above but from at least one encompassing geometric shape already obtained in a previous iteration (for example, a non-"empty" encompassing geometric shape). This at least one iteration optionally can allow (as illustrated in FIG. 7) at least one other geometric encompassing shape to be obtained on which a new iteration can be performed, for example. During an iteration, the first table 550 and the second table 560 representing the histograms of an encompassing geometric shape 540 then assume sizes (i.e., number of elements) corresponding to one of the dimensions (width, length) of the encompassing geometric shape on which the iteration is based, as illustrated in FIG. 7. The use of smaller histogram sizes can help to obtain at least one encompassing geometric shape that is smaller than the one from which it was obtained, and optionally to identify and remove, from among these new obtained shapes, new "empty" shapes, as illustrated in FIG. 8. As a result, in some embodiments, the iterations can help to more precisely outline the moving parts of an object represented by an encompassing geometric shape.

A criterion for stopping the iterations can be, for example, no generation of a new encompassing geometric shape during the last M iterations, with M being a strictly positive integer (for example, equal to 1), as illustrated in FIG. 8. In such an embodiment, the last obtained geometric encompassing shapes therefore no longer contain either empty rows or columns, as illustrated in FIG. 8).

In the example illustrated in FIGS. 3 to 8, the motion map is divided along horizontal and vertical axes. However, in some embodiments, other division axes can be used. For example, orthogonal axes inclined at a first angle relative to the vertical can be used. Such an alternative embodiment can be useful, for example, when at least some objects in the motion map cannot be separated by the horizontal and vertical axes. In such an embodiment, the method 300 can include an optional step (not illustrated in FIG. 3) of transforming the motion map (for example, a rotation following the first angle) before implementing the segmentation 330 described above. As illustrated in FIG. 3, in some embodiments, the method 300 can include a tracking 340 of at least one moving object in the monitored scene. This tracking can be optional in some embodiments.

At a given instant, an object is only partially visible via the camera capturing the monitored scene (with some parts of the object being obscured, for example, from the camera by the object itself). Furthermore, as the object moves, different parts of the object become visible to the camera (and therefore in the obtained images) over time. As a result, all the portions associated with the same object in motion maps can therefore vary in terms of shape, size and/or position throughout the images (therefore between several motion maps). The use of encompassing geometric shapes for tracking, which are less variable than the objects themselves, can help to "smooth" the tracking. In some embodiments, the tracking can also take into account the ratios between the dimensions of the encompassing shapes (for example, a ratio between the width and the length of a shape). Indeed, using such a ratio between the dimensions can help, for example, carry out tracking that is less sensitive to apparent variations in the size (on the images) of an object following a variation in its distance from the camera capturing the scene, and thus help to retain the same object identifier over a plurality of encompassing geometric shapes of different motion maps corresponding to the same object for which the distance from the camera varies.

The tracking 340 can be carried out, for example, on at least one first encompassing geometric shape derived from the segmentation 330 of a first motion map, in conjunction with at least one second motion map temporally preceding the first motion map. The tracking 340 can be carried out, for example, on all the encompassing geometric shapes derived from the segmentation 330 between at least two motion maps generated at different instants. On the one hand, this involves assigning an identifier to an encompassing geometric shape that is different from those of the other encompassing geometric shapes moving in the motion map to which it belongs, and, on the other hand, this involves attempting to track the objects encompassed by the encompassing geometric shapes between the various motion maps (for example, consecutive motion maps). To this end, the same identifier can be assigned to the encompassing geometric shapes of successive motion maps, which appear to correspond to the same object.

An example of tracking between two temporally successive motion maps $mvt_{t-1}$ and $mvt_t$ is described in more detail hereafter.

In some embodiments, the tracking 340 can include obtaining 342 relative positioning information of the encompassing geometric shapes of the motion map $mvt_t$ and of the encompassing geometric shapes of the motion map $mvt_{t-1}$. For example, the method can include obtaining 342 distances (for example, Euclidean distances) between the centroids of the encompassing geometric shapes of the motion map $mvt_t$ and the motion map $mvt_{t-1}$.

The term "centroid" in this case refers to the center of an encompassing geometric shape. The Euclidean distance d between two encompassing geometric shapes for which the centroids have the respective coordinates $x_1,y_1$ and $x_2,y_2$, can be obtained by the equation:

$$d = \sqrt{(x_1-x_2)^2+(y_1-y_2)^2}.$$

As illustrated in FIG. 3, the method can comprise, for at least one first encompassing geometric shape of the motion map $mvt_t$, conditionally associating 344 this first encompassing geometric shape with a second encompassing geometric shape of the motion map $mvt_{t-1}$, taking into account the obtained relative positioning information, and assigning

346 an object identifier to the first encompassing geometric shape, taking into account this conditional association. The second encompassing geometric shape is, for example, the encompassing geometric shape of the motion map $mvt_{t-1}$ closest (according to the obtained relative positioning information) to the first encompassing geometric shape of the motion map $mvt_t$.

In some embodiments where the relative positioning information of two encompassing geometric shapes is a distance between these two encompassing geometric shapes, associating the first encompassing geometric shape with the second encompassing geometric shape can be effective when the distance between the first encompassing geometric shape of the motion map $mvt_t$ and the second encompassing geometric shape of the motion map $mvt_{t-1}$ is less than a first distance (used as a threshold).

In some embodiments, the method can comprise assigning 346, to the first encompassing geometric shape, the object identifier already (previously) assigned to the second encompassing geometric shape. Indeed, the first and second encompassing geometric shapes are considered to be corresponding to the same object.

When the distance between the first encompassing geometric shape of the motion map $mvt_t$ and the second encompassing geometric shape of the motion map $mvt_{t-1}$ is greater than the first distance, the first encompassing geometric shape is considered to be corresponding to an object other than the second encompassing geometric shape. When the distance between the first encompassing geometric shape of the motion map $mvt_t$ and all the encompassing geometric shapes of the motion map $mvt_{t-1}$ is greater than the first distance, the first encompassing geometric shape is considered to be corresponding to an object that has recently appeared or that has recently begun moving in the scene and the method comprises assigning 346 a new object identifier (not assigned at the instant t to another encompassing geometric shape of the same or of another motion map) to the first encompassing geometric shape.

The new object identifiers can be generated, for example, in such a way as to ensure their uniqueness with respect to other identifiers already assigned at a current instant. For example, this can involve object identifiers each comprising at least one digital portion obtained by successive incrementation of the same digital variable.

In some embodiments, the method can further comprise storing 348 (in a storage zone accessible to the device) the newly assigned object identifier (for example, in a field of a data structure representing the first encompassing geometric shape).

According to the embodiments, the first distance used as a threshold can be a constant distance or a variable distance, for example adjustable by configuration (for example, so as to depend on a type of objects to be tracked). Indeed, the distance that the same object is likely to travel between two successive obtained images (and therefore between two successive motion maps) can significantly vary depending on the objects (for example, depending on whether it is a car, a pedestrian, etc.).

In some embodiments, the method can include filtering 350 of the tracked encompassing geometrical shapes. This filtering can be, for example, a function of a type of object targeted by the tracking, so as to exclude the encompassing geometric shapes from the tracking that do not a priori correspond to a targeted type of object, and/or, on the contrary, to limit the tracking to the shapes that do a priori correspond to a targeted type of object. For example, in the illustrated embodiment, the filtering can allow the tracking to be limited to encompassing geometric shapes identified as vehicles.

The identification of encompassing geometric shapes to be excluded and/or restricted from tracking can be carried out, for example, over time on all the encompassing geometric shapes tracked 340 in the motion maps.

The identification of encompassing geometric shapes to be excluded and/or restricted from tracking can be implemented, for example, by taking into account the size of the encompassing geometric shapes relative to an expected (probable) size of the targeted objects, or a ratio between the width and/or the length of the encompassing geometric shapes.

In the illustrated embodiments, where vehicles (truck, car, motorbike, etc.) are targeted, the geometric encompassing shapes that are too small to correspond to a vehicle (and are considered to be spurious objects, such as a pedestrian or a bird) can be excluded from the tracking, for example.

Moreover, in some embodiments, an indication relating to a type of targeted object (truck, car, motorbike, etc.) to which an encompassing geometric shape corresponds can be derived from the width, the length and/or the width-to-length ratio of the encompassing geometric shape. This can involve, for example, a comparison with a table of correspondence or a library of encompassing geometric shapes classified per type of object.

Alternatively, in some embodiments, the method can implement "frugal" artificial intelligence models in order to, based on the width and the length of the encompassing geometries, identify a type of targeted object (for example, a type of vehicle). This can involve, for example, neural networks with a low number of neurons per layer and the parameters of which have been quantified in order to remain frugal in terms of computer resource consumption (memory and/or processing complexity). The inference of such a neural network can be implemented locally on the device 200, for example.

According to the embodiments, different processing 360 also can be implemented on the tracked (and optionally filtered) encompassing geometric shapes. For example, in some embodiments, the method can include counting 360 the filtered encompassing geometric shapes. In the illustrated embodiments, the encompassing geometric shapes corresponding to vehicles can be counted, for example.

The implemented processing can take into account, for example, at least one portion, called portion of interest, of a motion map that is considered to be of interest. In some embodiments, the "portion of interest" can be a one-dimensional geometric shape (such as a line (or straight line) or a curve). This can involve, for example, a boundary (called boundary of interest) that a moving object can cross, or a zone. In the example shown in FIG. 10, an encompassing geometric shape equated with a vehicle can be counted when it crosses a straight line 428 of interest in a motion map 420. In some embodiments, the "portion of interest" can be a two-dimensional geometric shape (such as a circle, a triangle, a square, a rectangle, a diamond, etc.). It can be, for example, a surface or zone (called zone of interest) in which a moving object can enter or leave. For example, an encompassing geometric shape can only be counted when its centroid is within a zone of interest of a motion map.

In some embodiments, several portions of interest (with the same or different dimensions) relating to the captured scene can be defined in the motion maps.

In some embodiments, the method can take into account (for counting 360, for example) a direction of movement of the encompassing geometric shapes. In the example illustrated in FIG. 10, the encompassing geometric shapes equated with a vehicle thus can only be counted if they cross the line of interest 428 of the portion 427 above the line 428 of the motion map 420 toward the portion 429 below the line 428 of the motion map 420. The direction of movement of an object can be obtained, for example, (when tracking 340 the encompassing geometric shapes, for example) from the successive coordinates of the centroids of the encompassing geometric shapes to which the object identifier in the motion maps is assigned. The coordinates of the centroid of an encompassing geometric shape can be stored, for example, in the data structure representing the encompassing geometric shape.

In some embodiments, the method can include rendering 370 at least one motion map on a user interface of said device 200. The rendering can also include, in some embodiments, at least one encompassing geometric shape of the motion map and optionally an object identifier with which it is associated. It also optionally can include at least one portion of interest of the motion map.

At least some embodiments of the method of the present application can use only a small number N of images (for example, 3) to construct a motion map and be implemented for applications where only a few objects are tracked at the same time, or target only a few object types, and therefore can be less memory intensive than some prior art solutions.

In at least some embodiments, the obtained images can be low resolution images. Moreover, the operations implemented on these images can be simple algebraic operations that can be available on all common types of processors and microcontrollers. Also, at least some embodiments of the method of the present application can be less intensive in terms of processing capacity and/or energy than some solutions of the prior art. For example, the implementation of at least some embodiments of the method of the present application does not require specific processors such as specialized processors for graphic processing (of the GPU (Graphic Processing Unit) type, for example) or in neural network inference (of the TPU (Tensor Processing Unit) type, for example).

As a result, some embodiments of the method of the present application can be implemented on "light" devices (of the Raspberry Pi 3© type), while allowing processing of 640×480 (or 480×640) pixel video at approximately 12 images per second (when some solutions of the prior art, for example, can only allow processing of 416×416 video at 2 or 3 images per second on this type of device).

Some embodiments of the present application can thus assist in benefiting from an object identification and counting solution with lower computation costs than some solutions of the prior art, and requiring minimal power. Such embodiments can thus assist in addressing the recurring problems of installing these counting systems (in particular by avoiding costly works) and of using them (in terms of energy cost and computing power).

Some embodiments of the method of the present application have been described above.

However, the method can be used in many applications for identifying and counting moving objects in various fields, and without requiring major infrastructure works, or significant processing or communication capacities. In some embodiments, the method of the present application can be adapted for very low cost detection, tracking, identification and/or counting of vehicles, and can be implemented, for example, by a mobile device, which is easily transportable, for example, as required.

Figure 11:
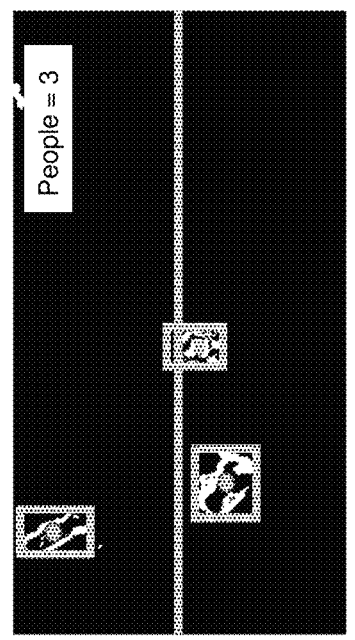
FIG. 11 shows an example of an application of the method of the present application to counting pedestrians, in some embodiments of the method of the present application.

For example, the method can be applicable, in at least some of its embodiments, in difficult environments (isolated or with minimal infrastructure or computing means) (as is sometimes the case in developing countries). The method particularly can be applied to roadways, freeways, highways, the outskirts of warehouse or industrial sites where the vehicles entering and exiting a zone need to be counted. In some embodiments, the method also can be applied to identifying and counting bicycles, animals or pedestrians, as shown in FIG. 11 (which illustrates the identification of pedestrians from images obtained from a top view of a scene).

In some embodiments, the method can be implemented without using expensive artificial intelligence models (in terms of computing power and storage capacity and learning time), and/or sophisticated remote systems that consume network resources.

The invention claimed is:

1. A motion detection method, implemented in an electronic device, said method comprising:
   obtaining at least two temporally spaced images capturing a same scene of a video stream;
   generating from said at least two temporally spaced images at least a first motion map divided into portions representing differences between values of at least two video channels for a zone of said at least two temporally spaced images, using at least one processor of said electronic device;
   obtaining, using at least one processor of said electronic device, a first histogram relating to portions resulting from a division of said motion map into rows and columns along two different division axes, the first histogram counting a number of moving portions per column in said motion map;
   obtaining, using at least one processor of said electronic device, a second histogram relating to said portions, the second histogram counting a number of moving portions per row in said motion map; and
   generating, using at least one processor of said electronic device, at least one encompassing geometric shape corresponding to an intersection in the motion map of the columns comprising at least one non-zero element of the first histogram and the rows comprising at least one non-zero element of the second histogram.

2. The motion detection method according to claim 1, wherein a value of a portion of said first motion map is a binary value taking into account differences between the values of each video channel for said zone of said images.

3. The motion detection method according to claim 2, wherein said value of a portion of said first motion map takes into account the most differences of each video channel for said zone of said images.

4. The motion detection method according to claim 1, wherein:
   the method comprises obtaining a motion map for each video channel of said images, with the motion map of a video channel of said images being divided into portions representing differences for a zone of at least two of said images, for the video channel associated with said motion map;
   said first motion map is the motion map, from among the motion maps associated with each of the video channels of said images, that comprises the most portions for which the binary value represents a difference for a zone of said images, for the associated video channel.

5. The motion detection method according to claim 1, wherein said geometric shape is a rectangular shape.

6. The motion detection method according to claim 1, wherein said method is iteratively implemented on successive images of the video stream and comprises:

obtaining the first motion map and a second motion map temporally preceding said first motion map, conditionally associating a first encompassing geometric shape obtained for the first motion map with at least one second encompassing geometric shape obtained for at least said second motion map, said associating taking into account relative positions of said first and second encompassing shapes on said first and second motion maps.

7. The motion detection method according to claim 6, comprising assigning a same object identifier to said first and second associated geometric shapes.

8. The motion detection method according to claim 1, comprising assigning a type of object to at least one geometric shape, with said assigning taking into account a size, a width and/or a length of said geometric shape.

9. The motion detection method according to claim 1, comprising:

obtaining a third histogram counting the number of moving portions per column in at least one third shape of said obtained encompassing shapes;

obtaining a fourth histogram counting the number of moving portions per row in said third obtained encompassing shape;

obtaining at least a fourth encompassing geometric shape corresponding to an intersection in the motion map of the columns comprising at least one non-zero element of the third histogram and of the rows comprising at least one non-zero element of the fourth histogram.

10. The motion detection method according to claim 9, wherein said obtaining said third and fourth histograms are implemented successively on at least one previously obtained encompassing geometric shape of the motion map.

11. The motion detection method according to claim 10, wherein the method comprises rotating said first motion map prior to dividing said first motion map.

12. An electronic device comprising:

at least one processor, said at least one processor being configured to:

obtain at least two temporally spaced images capturing a same scene of a video stream;

generate from said at least two temporally spaced images at least a first motion map divided into portions representing differences between values of at least two video channels, for a zone of said at least two temporally spaced images;

obtain a first histogram relating to portions resulting from a division of said motion map into rows and columns along two different division axes, the first histogram counting a number of moving portions per column in said motion map;

obtain a second histogram relating to said portions, said second histogram counting a number of moving portions per row in said motion map; and generate at least one encompassing geometric shape corresponding to an intersection in the motion map of the columns comprising at least one non-zero element of the first histogram and the rows comprising at least one non-zero element of the second histogram.

13. An electronic device according to claim 12, wherein a value of a portion of said first motion map is a binary value taking into account differences between the values of each video channel for said zone of said images.

14. An electronic device according to claim 13, wherein said value of a portion of said first motion map takes into account the most differences of each video channel for said zone of said images.

15. An electronic device according to claim 12, wherein said at least one processor is configured to obtain a motion map for each video channel of said images, with the motion map of a video channel of said images being divided into portions representing differences for a zone of at least two of said images, for the video channel associated with said motion map, and wherein said first motion map is the motion map, from among the motion maps associated with each of the video channels of said images, that comprises the most portions for which the binary value represents a difference for a zone of said images, for the associated video channel.

16. An electronic device according to claim 12, wherein said geometric shape is a rectangular shape.

17. The electronic device according to claim 12, wherein said at least one processor is configured to:

obtain a third histogram counting the number of moving portions per column in at least one third shape of said obtained encompassing shapes;

obtain a fourth histogram counting the number of moving portions per row in said third obtained encompassing shape; and obtain at least a fourth encompassing geometric shape corresponding to an intersection in the motion map of the columns comprising at least one non-zero element of the third histogram and of the rows comprising at least one non-zero element of the fourth histogram.

18. A non-transitory computer readable medium comprising a computer program recorded therein comprising instructions for implementing, when the program is executed by a processor of an electronic device, a motion detection method implemented in the electronic device, said method comprising:

obtaining at least two temporally spaced images capturing a same scene of a video stream;

generating from said at least two temporally spaced images at least one first motion map divided into portions representing differences between values of at least two video channels for a zone of said at least two temporally spaced images;

obtaining a first histogram relating to portions resulting from a division of said motion map into rows and columns along two different division axes, the first histogram counting a number of moving portions per column in said motion map;

obtaining a second histogram relating to said portions, the second histogram counting a number of moving portions per row in said motion map; and generating at least one encompassing geometric shape corresponding to an intersection in the motion map of the columns comprising at least one non-zero element of the first histogram and the rows comprising at least one non-zero element of the second histogram.

19. The motion detection method according to claim 1 including rendering the first motion map or the at least one geometric shape on a display device.

20. The electronic device according to claim 12, wherein the at least one processor is configured to render the first motion map or the at least one geometric shape on a display device.

* * * * *